US005562459A

United States Patent [19]

Durlach

[11] Patent Number: 5,562,459

[45] Date of Patent: Oct. 8, 1996

[54] DYNAMIC THREE DIMENIONAL AMUSEMENT AND DISPLAY DEVICE

[76] Inventor: David M. Durlach, 1 Fitchburg St., Ste. C-411, Somerville, Mass. 02143

[21] Appl. No.: 562,624

[22] Filed: Nov. 24, 1995

Related U.S. Application Data

[63] Continuation of Ser. No. 178,914, Jan. 7, 1994, abandoned.

[51] Int. Cl.[6] .......... G09B 25/00

[52] U.S. Cl. .......... 434/402; 434/365; 434/430; 345/110; 40/455

[58] Field of Search .......... 434/81, 308, 307 R, 434/365, 402, 403, 428, 430; 472/71, 72; 446/149; 273/153 S; 40/446, 455, 473, 484, 493, 494, 501, 503, 511; 345/55, 108–111

[56] References Cited

U.S. PATENT DOCUMENTS

| | | | |
|---|---|---|---|
| 3,199,098 | 8/1965 | Schwartz | 345/110 |
| 3,307,170 | 2/1967 | Aoyama et al. | 434/402 X |
| 4,021,946 | 5/1977 | Bradshaw | 345/110 X |
| 4,638,580 | 1/1987 | Giannetti et al. | 40/473 X |
| 4,761,905 | 8/1988 | Black | 345/110 X |
| 4,800,381 | 1/1989 | Joseph et al. | 345/109 |
| 5,022,172 | 6/1991 | Kawahara et al. | 40/446 X |
| 5,046,274 | 9/1991 | David | 40/493 X |
| 5,063,377 | 11/1991 | Smith | 345/110 |
| 5,245,772 | 9/1993 | Girardot | 40/473 |
| 5,325,108 | 6/1994 | Salam | 345/108 |

FOREIGN PATENT DOCUMENTS

| | | | |
|---|---|---|---|
| 3139997 | 12/1978 | Japan | 345/111 |

*Primary Examiner*—Joe Cheng

[57] ABSTRACT

A three-dimensional display device for commercial advertisement and science museum displays is disclosed. Three-dimensional elements are stacked horizontally or vertically along a stationary shaft around which they rotate, and are coupled together in such a way that they perform as a torsional wave medium and chaotic system. Display surfaces can be attached to the three-dimensional rotatable elements such that mirrors, text, imagery, and products can be viewed as the elements rotate. The rotatable elements can be spun by hand. Alternatively, servo motors and computer control permit the device to be choreographed and synchronized to an accompanying audio track.

26 Claims, 9 Drawing Sheets

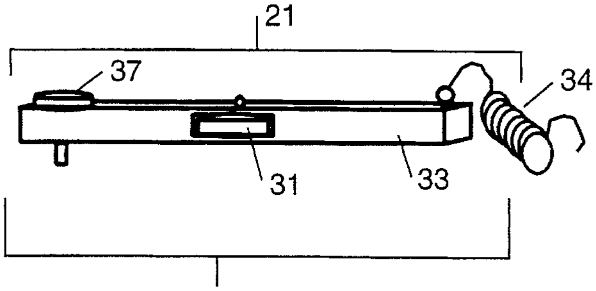
Fig. 3-A
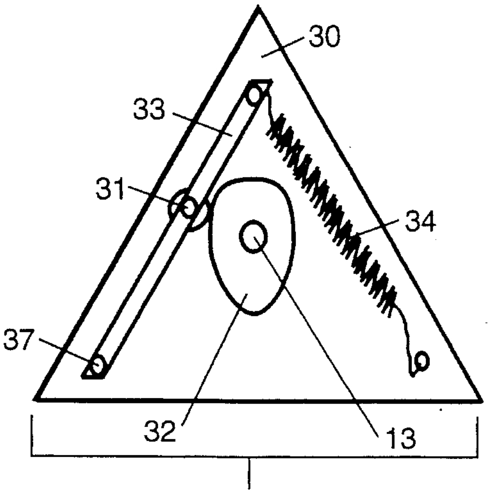
Fig. 3-B
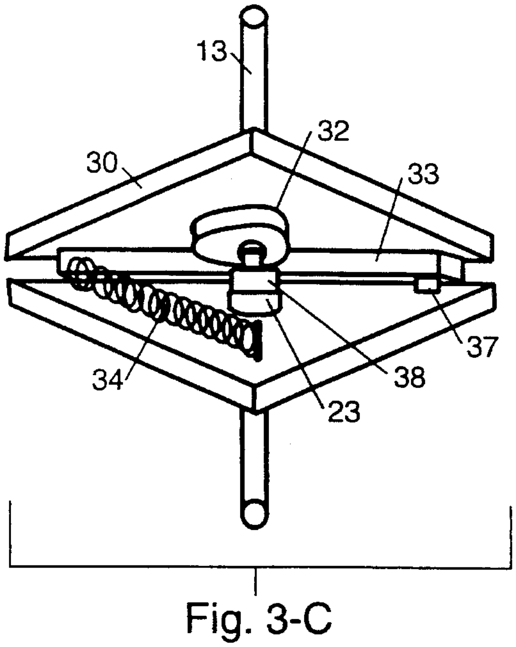
Fig. 3-C
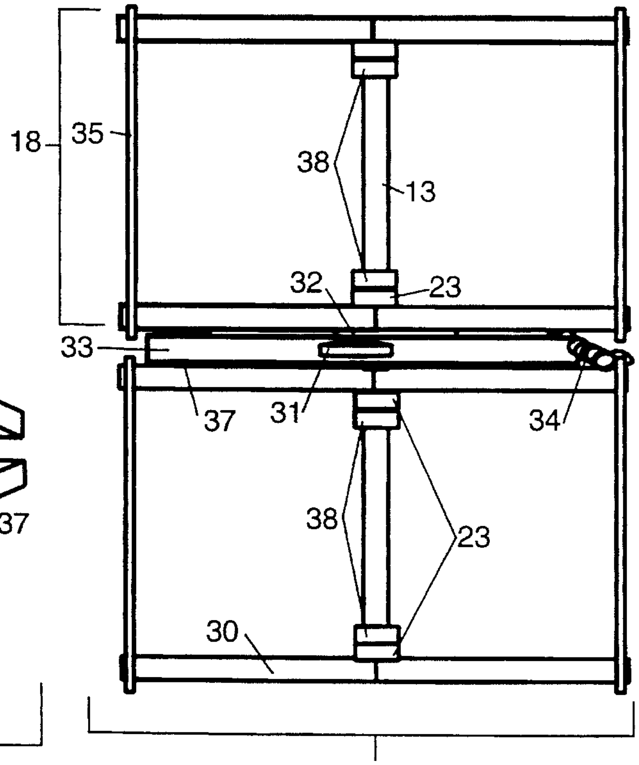
Fig. 3-D

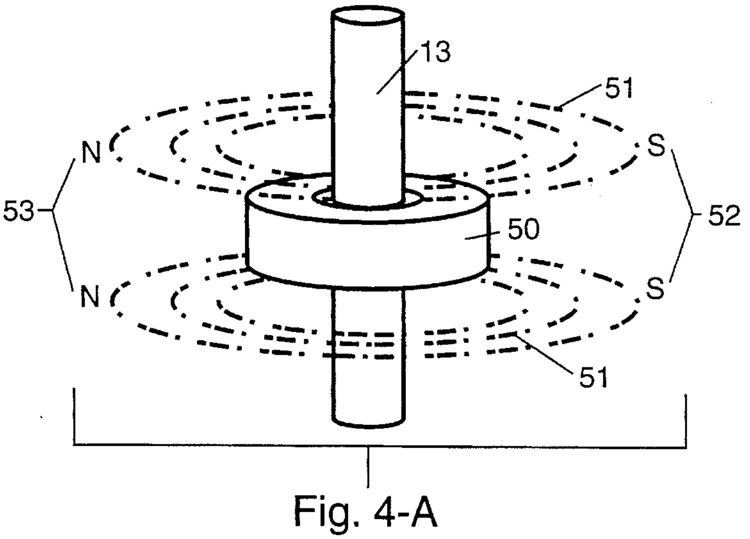
Fig. 4-A
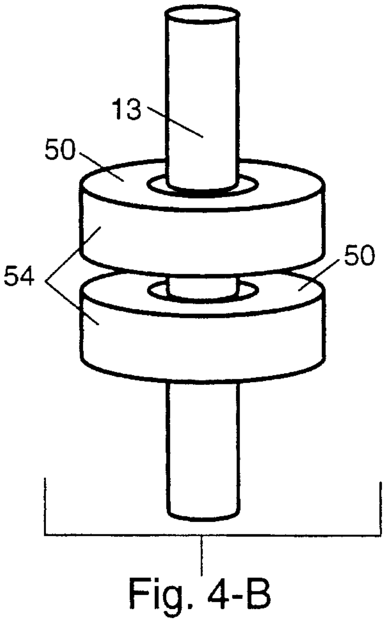
Fig. 4-B
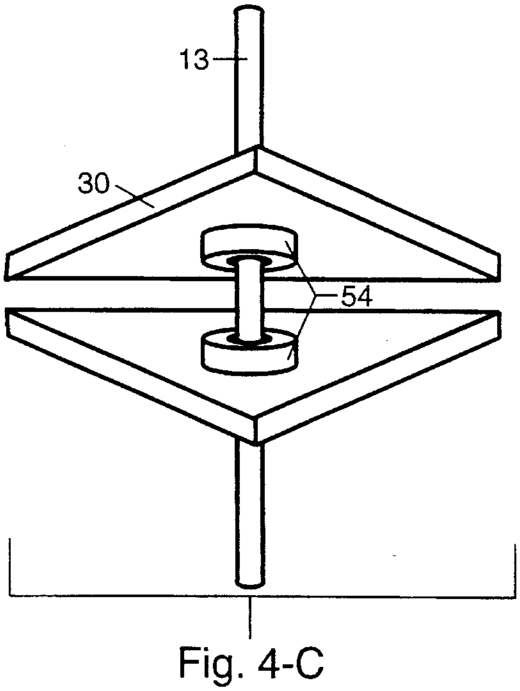
Fig. 4-C
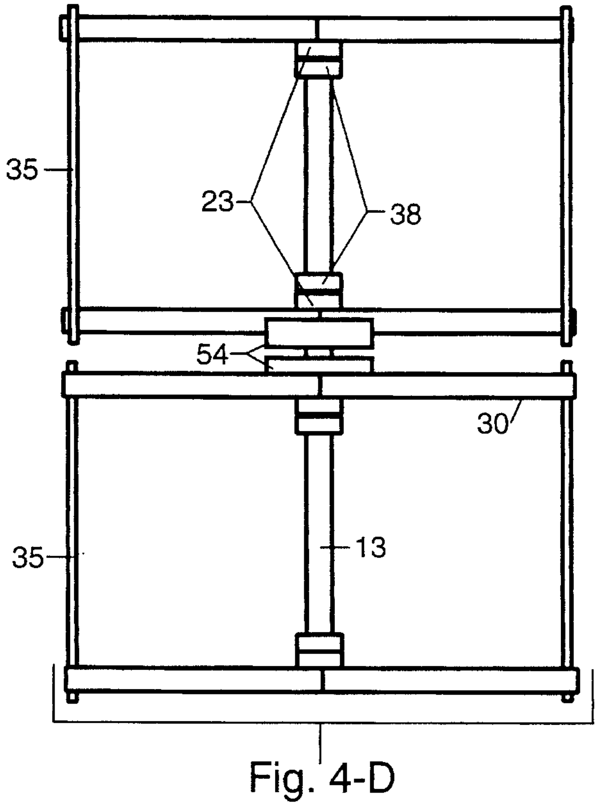
Fig. 4-D

DYNAMIC THREE DIMENIONAL AMUSEMENT AND DISPLAY DEVICE

This is a continuation of application Ser. No. 08/178,914, filed Jan. 7, 1994, now abandoned.

BACKGROUND OF THE INVENTION

1. Field of Invention

This invention relates to kinetic display devices, specifically to such devices that combine aspects of science exhibits and commercial advertising displays.

2. Description of Prior Art

Various moving display devices exist for use in science exhibits and commercial advertising. Of the existing devices many do not function adequately in both educational and commercial contexts.

Science exhibits exist which visually demonstrate difficult concepts of physics. Two common physical principles that are demonstrated are wave motion and chaotic systems. Common wave exhibits include: wave tanks, oscillating ropes, and twisting pairs of strings with perpendicular cross struts to highlight torsion wave motion. Common exhibits which represent chaotic systems include: multi-jointed chaotic "pendulums", water droplet formation, and demonstrations of water wheel rotation as a function of the flow rate of the waterfall driving it.

All the science exhibits heretofore known to demonstrate principles of wave motion or chaotic systems suffer from a number of disadvantages. No single exhibit effectively merges and visually highlights these two physical principles simultaneously. Such a merger is important from the point of view of visual attraction, complexity, and beauty. In addition, the combination of the two exhibits saves money and space. The existing exhibits that demonstrate either wave motion or chaotic systems are almost always either hand-activated or controlled by simple electro-mechanical means. As a result the control of such devices is limited. Such limited control fails to produce a highly dynamic exhibit and thereby fails to adequately engage the viewer's attention. Additionally, existing physics exhibits were not designed to have the imagery of the facade (words, pictures, etc.) changed in a simple and straightforward manner. Physics exhibits were also not previously designed to allow easy variation in an accompanying audio track, which may be an integral part of the display. Thus, existing physics exhibits cannot readily have audio tracks synced to the displays in order to serve as welcoming and adjustable informative signs within museum entrances and exhibit areas. To be flashy and eye catching science exhibits, previous displays have frequently utilized a multitude of expensive electro-mechanical components and thus have been prohibitively costly for certain applications. Less expensive displays have typically had a limited range of motions and lacked the visual flash necessary to effectively engage the average viewer.

Commercial signs are often designed to attract attention in order to sell products. A variety of kinetic three-dimensional sign technologies and product displays exist in the advertising industry, especially in the industries of point of purchase displays, trade shows, and special events. One such type of display includes signs with images on each of three faces of rigid vertically oriented triangular columns, where at periodic intervals, all the triangular columns rotate uniformly 120 degrees to show a new image. Other examples include turntables which rotate at a regular rate displaying products, and cylindrical eyeglass displays which can be turned by the consumer to provide a view of all for-sale items. More sophisticated displays also exist, such as fully programmable and life-like robots, and computer controlled fountains which display words and letters.

Many of the three-dimensional commercial displays heretofore known suffer from one or more of a number of disadvantages. In the less expensive displays, the motions are frequently not exciting to the typical observer. Sometimes the display is non-interactive. Other times the display is not designed for the easy addition of a synchronous audio track. The less expensive displays have limited range of motions and lack "visual flash" to effectively engage the typical viewer. Programmable displays exist, however, they can be costly to purchase and maintain. They can sometimes be noisy or difficult to install. In addition, to be effective advertising devices, the programmable displays often require a multitude of expensive electro-mechanical components and thus can be cost prohibitive. In many instances both the less expensive and more expensive displays cannot be readily expanded, altered or updated.

Accordingly, there is a need for a three-dimensional display device which merges wave motion and chaotic systems in an inexpensive and interactive manner, providing a more engaging science exhibit. Similarly, there is a need for a three-dimensional display device appropriate for use in commercial settings which provides an exciting and eye-catching presentation in a cost-effective manner. The present invention satisfies the above needs, can be used in both commercial and non-commercial settings, can be synchronized with an audio track, and can be easily expanded, altered or updated.

SUMMARY OF THE INVENTION

The present invention discloses a three-dimensional amusement and display device that combines aspects of science exhibits and commercial advertising displays. Accordingly, several objects and advantages of the present invention are: to provide a display which demonstrates complicated wave and chaotic motions for physics exhibits; to provide a display which is modest in cost and available in a number of different embodiments of increasing cost and complexity; to provide a display which is interactive, allowing either direct human contact or indirect interaction through computer means; to provide a display which can be easily altered by changing the facade; to provide a display which can readily be synchronized to an audio track; to provide a display with varied and complex motions with a minimum of expensive electro-mechanical components; and to provide a display which can be used in commercial and non-commercial settings to display words. images and products in a visually attractive manner.

This three-dimensional amusement and display device is comprised of a plurality of rotatable elements which are themselves three-dimensional. These elements are linearly arranged along their axis of rotation and their surfaces are display panels. The elements are coupled such that they rotate around their central means of support, functioning collectively as a torsional wave medium and chaotic system. The display device includes means of support for the rotational elements and also includes a means whereby these elements are rotated. This type of display device offers the user a visually stimulating and appealing method of advertisement and exhibit while also demonstrating principles of wave motion and chaotic systems.

A preferred embodiment of this invention comprises three dimensional elements aligned in a column. The three dimensional elements freely rotate around a vertical shaft. Due to specific methods of coupling the elements together, the column functions simultaneously as a wave medium and a chaotic system. The display surfaces of the three dimensional elements may be easily interchanged or replaced through the use of quick release fasteners, such as of the hook and loop variety. The user can attach and easily change specific visual images, text and actual products for display in commercial and educational settings. Mirrored surfaces may be attached to one or more sides of each element, and appropriate illumination (i.e., sunlight or high intensity spotlights) can be added to magnify the wave and chaotic motion by many fold via the production of beams of reflected light onto surrounding wall, floor, and ceiling surfaces. This allows the invention to visually fill a large space and attracts attention from a significant distance with modest cost.

The three dimensional elements are coupled together by means of a unique spring loaded cam assembly. The specific shape of the cam provides linear restoring torque against the angular displacement of the elements. Different shaped cams will produce different torque-angle characteristics, which will result in different wave characteristics. Alternatively, magnets can be used instead of the cam assembly to produce magnetic coupling between the blocks. Other methods of joining the individual elements can also be envisioned.

This invention allows for direct contact with the display. The columns allow for human interaction with the spinning shapes, providing direct access to wave and chaotic features of the system, producing a highly memorable, educational, and tactile experience.

The elements form a column which is mounted with two (optional) computer controlled closed loop, position feedback servo motor systems. The motor and computer allow for greater complexity of movement. The computer component external events, including sound (including specific verbal commands), ambient light, button presses initiating a particular motion sequence, or an audio track.

In less expensive embodiments of this display, no motor is incorporated into the columns, and the device is manipulated by human contact only. Alternatively, a motor is attached which does not allow for feedback.

The device according to the present invention is self-contained and thus can be adapted for use in almost any environment. Two or more motorized columns can be placed in proximity to one another in order to construct an expandable kinetic computer controlled wall and display surface. The columns can be installed vertically, horizontally or at an angle. The display itself can be implemented in a wide variety sizes, from that of easily portable, to large permanent installations.

Still further objects and advantages will become apparent from a consideration of the ensuing description and drawings,

BRIEF DESCRIPTION OF THE DRAWINGS

For the purpose of illustrating the invention, there is shown in the drawings forms which are presently preferred; it being understood, however, that this invention is not limited to the precise arrangements and instrumentalities shown. In the drawings, like reference characters refer to the same parts throughout the different views. The drawings are not necessarily to scale, emphasis instead has been placed on illustrating the principles of the invention. Some drawings have been simplified to make clear the relevant detail.

FIG. 3*a* is an isometric view of the cam following assembly.

FIG. 3*b* is a plan of the cam following assembly, cam, and triangular base.

FIG. 3*c* is a perspective sectional diagram of the inter-element cam coupling.

FIG. 3*d* is an elevation of inter-element cam coupling.

FIG. 4*a* is an isometric view of the ceramic magnets and magnetic field lines.

FIG. 4*b* is an isometric view of two magnets coupled together.

FIG. 4*c* is a perspective sectional of two magnetically coupled Prism shaped elements.

FIG. 4*d* is an elevation of the magnetic inter-element coupling.

DETAILED DESCRIPTION OF PREFERRED EMBODIMENTS

Figure 1:
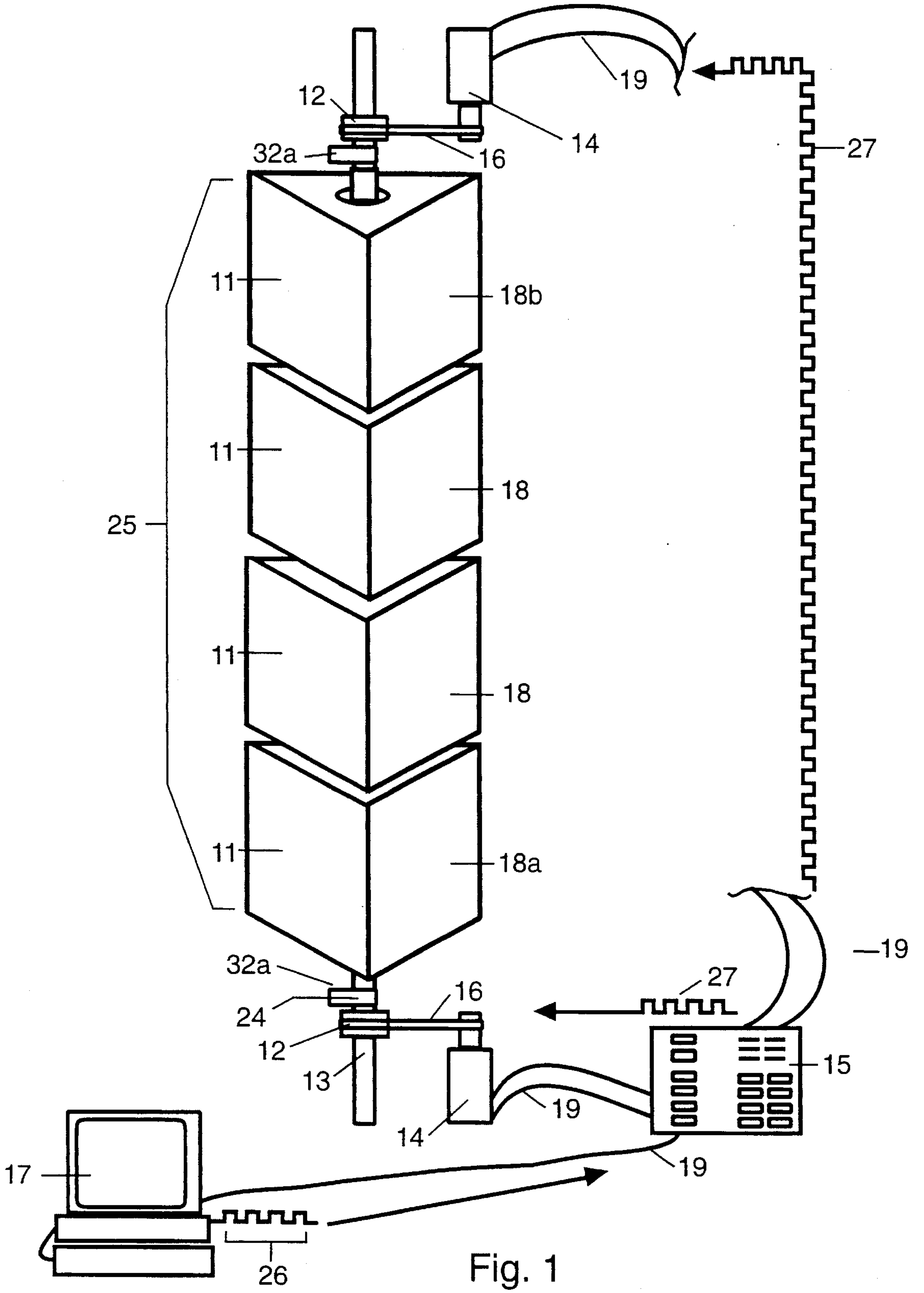
FIG. 1 is a general system overview depicting elements common to preferred embodiments.

The aspects common to all the preferred embodiments to be described are illustrated in FIG. 1. In accordance with the present invention there is shown a three dimensional amusement and display device. The device has three-dimensional elements, shown here as prism-shaped elements 18, linearly arranged in a column 25. The column 25 comprises a plurality of prism-shaped elements 18, including the two endmost prism-shaped elements 18*a* and 18*b:* a bottommost prism-shaped element located at the bottommost end of the vertical shaft 18*a*, and a topmost prism-shaped element located at the topmost end of the vertical shaft 18*b*. The stationary shaft 13 can be made from, but is not limited to, a metal such as aluminum, and provides structural support. In the preferred embodiments, the control mechanism is a computer 17 which sends digital information 26 to the computer motor interface 15 via electrical cables 19. The computer motor interface 15 changes digital data 26 into an analog stream of pulses 27 which is used to control the motor 14. The computer motor interface 15 can range in complexity, the most sophisticated of which will provide the computer 17 with information as to the angle of the shaft of the motor 14.

The motor 14, a direct current electric motor, drives the belt 16 which turns the gear 12. The gear 12 is mechanically linked to the cam 32*a* by a driving sheath 24, which surrounds but does not touch the stationary shaft 13. The cam 32*a* that is driven by the motor 14 is the same as cams 32 which lie between each prism-shaped element 18. The motor 14, in effect, drives the bottom half of the endmost prism-shaped element 18*a*. All the prism-shaped elements 18 are equipped with a cam 32 and a cam-following assembly 21, which function to loosely couple all the prism-shaped elements 18 in the column 25, such that they function as a torsional wave medium. As a result there is no direct drive motive force on any of the prism-shaped elements 18 in the column 25, thereby reducing the opportunity for physical injury to spectators. If a user grabs any of the prism-shaped elements 18, including the one directly adjacent to the motor, that prism-shaped element 18 will swing free of motor 14 control. When released, the prism-shaped element 18 will regain its connection with the motor 14 and resume its motion.

Figure 2:
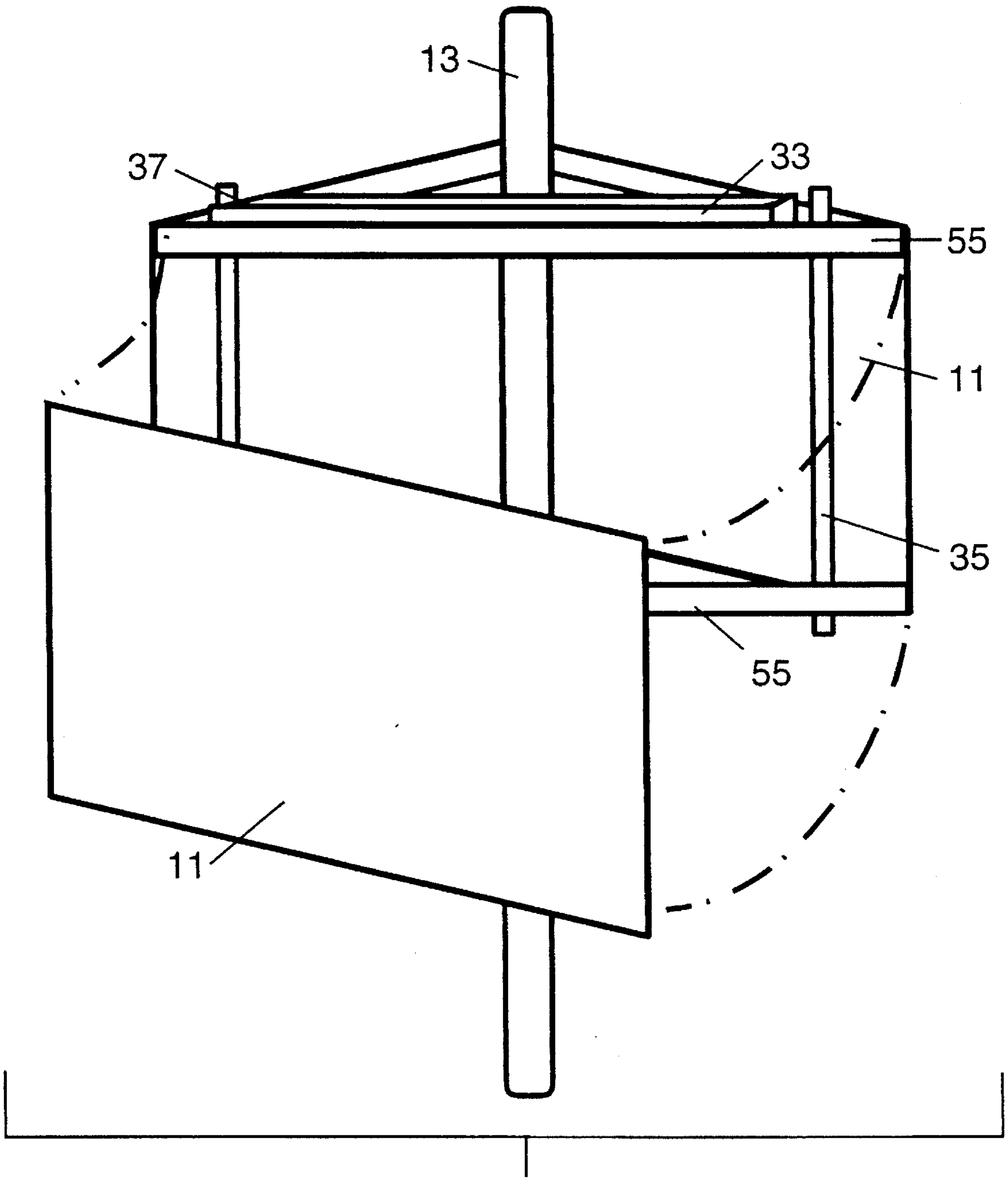
FIG. 2 is an isometric view of the removable display area.

As depicted in FIG. 2, each prism-shaped element 18 has three flat panel display areas 11, preferably 8.5"×11". The panel display areas 11 can be covered by mirrors, text, colored panels, or small products, for example, and can be easily altered by removal of the existing panel and replacement with a different panel, by means of hook and loop type fasteners 55.

Referring to FIGS. 3*a*–3*d*, each prism-shaped element 18 consists of a top and bottom triangular base 30 separated by support rods 35. Each prism-shaped element 18 has a cam 52 and cam-following assembly 21. The cam 32 is attached to the bottom triangular base 30 of each prism-shaped element 18. The only exception is in the case of the endmost prism-shaped element 18*a*, which has the cam-following assembly 21 mounted on both the top and bottom triangular bases 30, and has no cam 32 attached to either triangular base 30. Each individual prism-shaped element 18 is held in vertical position by two screw collars 38 which are fixed to the stationary shaft 13. Each prism-shaped element 18 is also equipped with two ball beatings 23, which are attached to its top and bottom triangular bases 30. The ball bearing 23 contacts the stationary shaft 13 and rests against the set screw collars 38, supporting the prism-shaped element 18. The ball beatings 23 allow for low friction rotation of the prism-shaped element 18 around the stationary shaft 13. The cam-following assembly 21 is attached to the top triangular base 30 of each prism-shaped element 18. The cam-following assembly 21 is comprised of the cam-following following roller 31, the cam-following arm 33, and the cam-following spring 34. The cam-following following roller 31 abuts and provides for low friction coupling with the cam 32 of the next adjacent prism-shaped clement 18. The cam-following arm 33 is a lever which keeps pressure on the roller 31, and couples two adjacent prism-shaped elements 18 via the cam 32. A pivot bearing 37 allows the cam-following arm 33 to move freely. The cam-following spring 34 is attached to the cam-following arm 33 in order to provide the force required for the coupling.

The shape of the cam 32 directly influences the link's torque/angle curve. The accuracy or the curve is necessary to be able to predict the properties of the torsional wave medium, in order to choreograph perfectly timed motion of the prism-shaped elements 18. It is possible to excite the column 25 from the endmost prism-shaped elements 18*a*, 18*b* by hand or by motor 14. Through the use of said cam 32 and said cam-following assembly 21, such excitation can cause one prism-shaped clement 18 to spin relatively free of its adjacent neighbor, demonstrating chaotic behavior.

FIGS. 4*a*–4*d* illustrate an alternative motive method for the coupling mechanism between prism-shaped elements 18 using magnets 50. The magnets 50 are ring-shaped and surround but do not touch the stationary shaft 13, and are mourned in the place of the cam 32 and cam-following assembly 21 of the other embodiments, on the top and bottom triangular base 30 of each prism-shaped element 18. The magnets 50 are magnetized along their faces, not through the core. The north poles 53 and south poles 52 are aligned such that they form a coupled pair 24 as a result of their mutual attraction. Enough spacing is provided between the prism shaped-elements 18 so the magnets 50 do not touch each other. This embodiment creates a similar, yet less predictable link between prism-shaped elements 18 which is less intricate and less expensive than the cam 32 and cam-following assembly 21 linkage.

Figure 5:
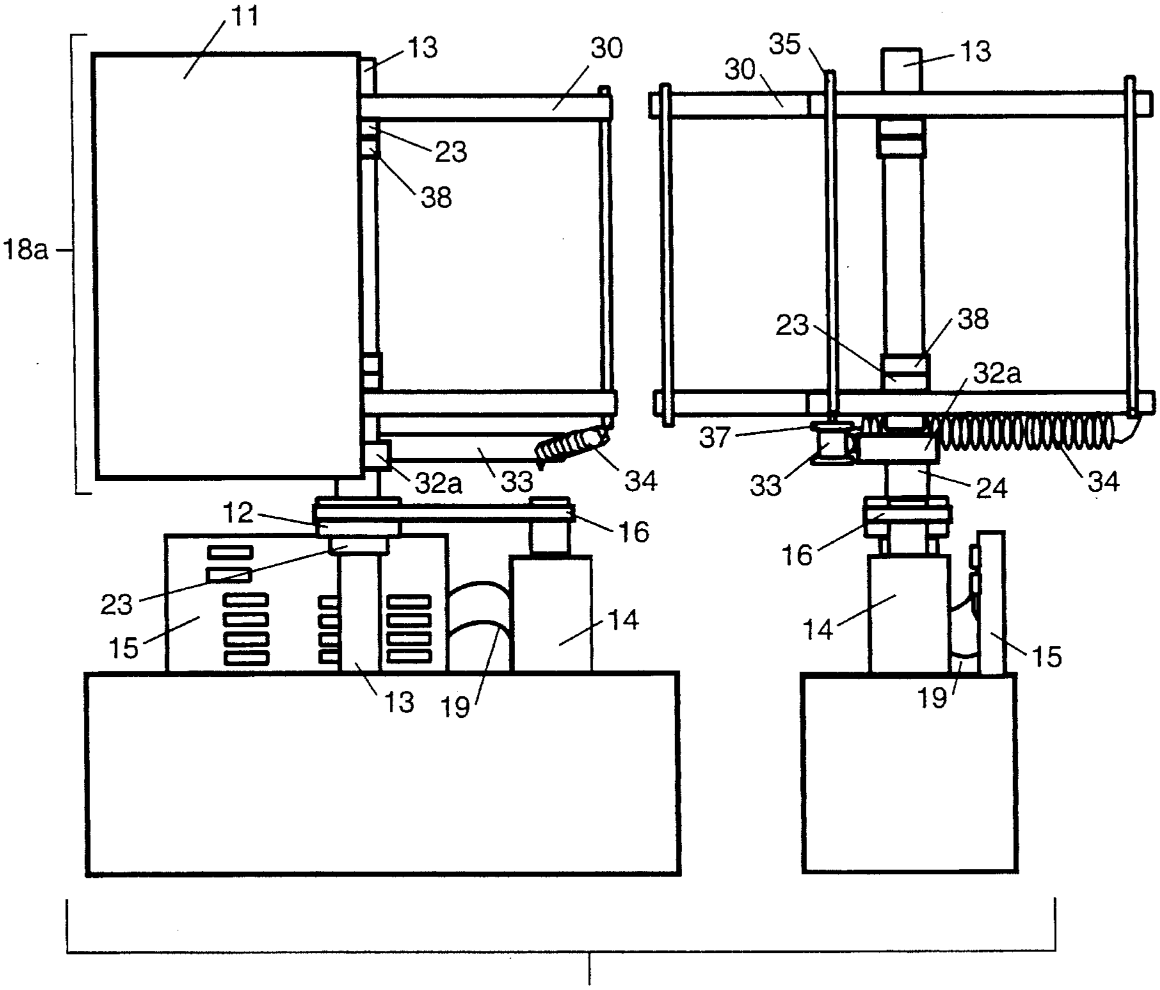
FIG. 5 depicts the details of the round base and motor driving belts and gears.

FIG. 5 depicts the motor 14, drive belt 16, and gears 12 contained within the round base 20. The motor is wired to the computer motor interface 15. A gear 12 is fixed on the shaft of the motor. A cam 32*a*, a drive sheath 24, and a gear 12 are fixed to one another and are mounted at the base of the stationary shaft 13 via ball bearings 23. The cam 32*a*, the drive sheath 24, and the gear 12 are thus free to rotate around the stationary shaft 13. A drive belt 16 connects the gears 12 to one another, thus causing the motor 14 to drive the cam 32*a*. The cam 32*a* drives the endmost prism-shaped element 18*a* via the cam 32*a* and cam following assembly means 21. This results in a rotation of the endmost prism-shaped element 18*a*. This rotation causes a sympathetic motion of its neighboring prism-shaped element 18 via the cam 32 and cam following assembly means 21 that couple each prism-shaped element 18 to its adjacent neighbor prism-shaped element 18. In this manner, nearly all of the direct drive components are safely contained within the round base 20, preventing the possibility of injury to spectators.

Figure 6:
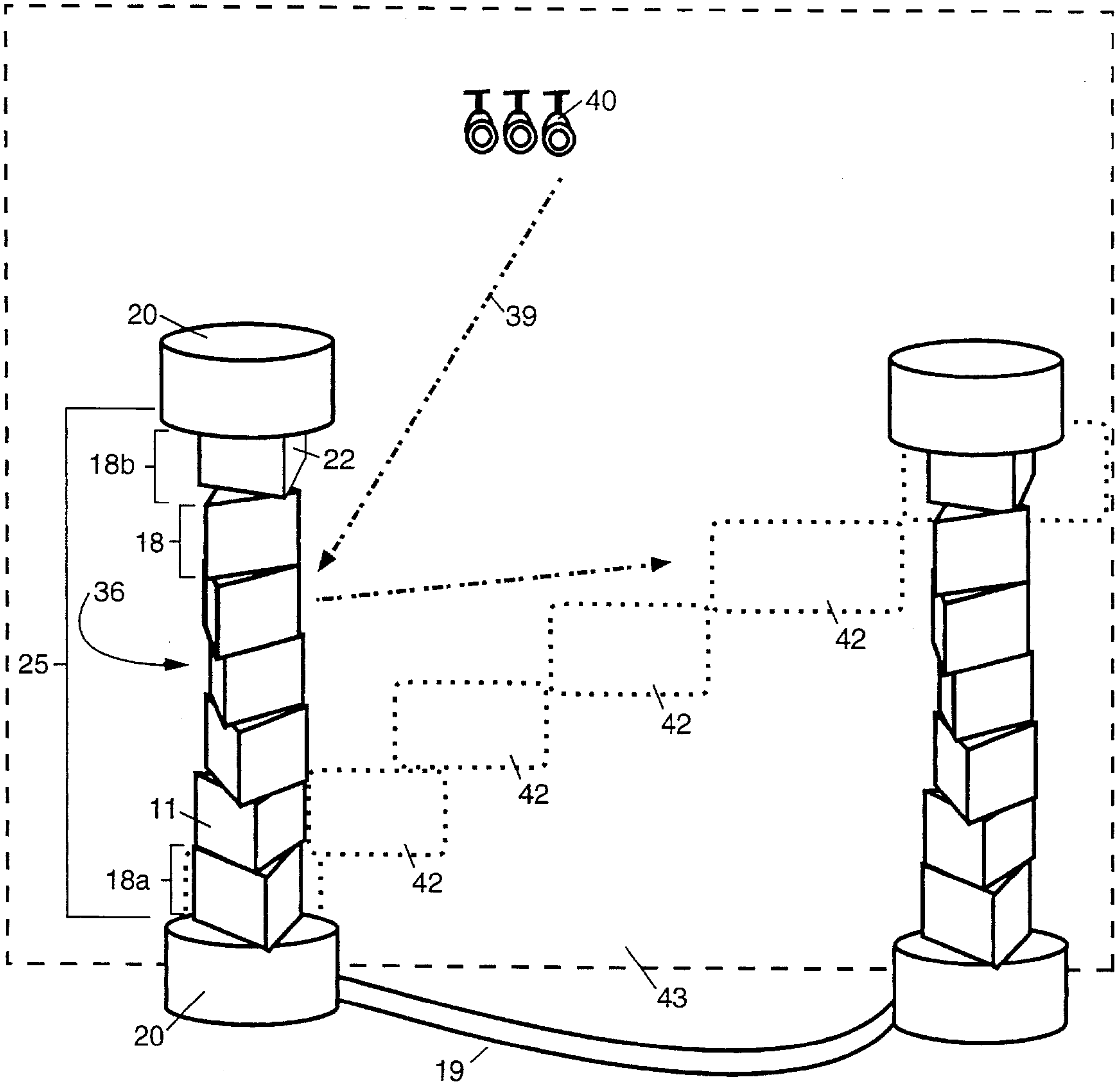
FIG. 6 is an isometric view of the first Preferred embodiment, consisting of two columns and light reflections.

The first preferred embodiment of the present invention is two columns each with reflective surfaces as illustrated in FIG. 6. This embodiment provides an amusement and display device which demonstrates wave motion as follows. A number of prism-shaped elements 18 are vertically stacked and coupled to form a column 25. The column 25 can be of any height, for example, eight feet tall and one foot wide is reasonable. A round base 20 is adjacent to both the bottommost and topmost prism-shaped elements 18*a* and 18*b*. Each base 20 includes a motor 14, drive belt 16, gear 12, and computer motor interface 15. An electrical cable 19 connects the elements inside the round base to the computer 17. In conjunction with the two motors 14, the column 25 of prism-shaped elements 18 demonstrates wave motion by acting as a torsional wave medium. The motors 14 initiate a wave propagation 36 in the medium of prism-shaped elements 18, by turning either clockwise or counter clockwise. Wave propagation 36 may also be initiated by human contact. The computer 17 can send signals to the computer motor interface 15 and thus to the motors 14 which control various aspects of the wave's behavior, including the wave's frequency. amplitude, and duration. By manipulating two motors 14 simultaneously, multiple standing waves, stationary twists, and other choreographed functions may be initiated and sustained. One display area 11 of each of the prism elements 18 is also covered with a reflective surface 22 so that light 39 from a light source 40 is reflected off the reflective surface 22 and results in reflected light 42 which appears on walls 43 and other interior surfaces. The reflected light 42 changes as the position of the prism-shaped elements 18 change. The resulting reflected light 42 is an extension of the display.

Figure 7:
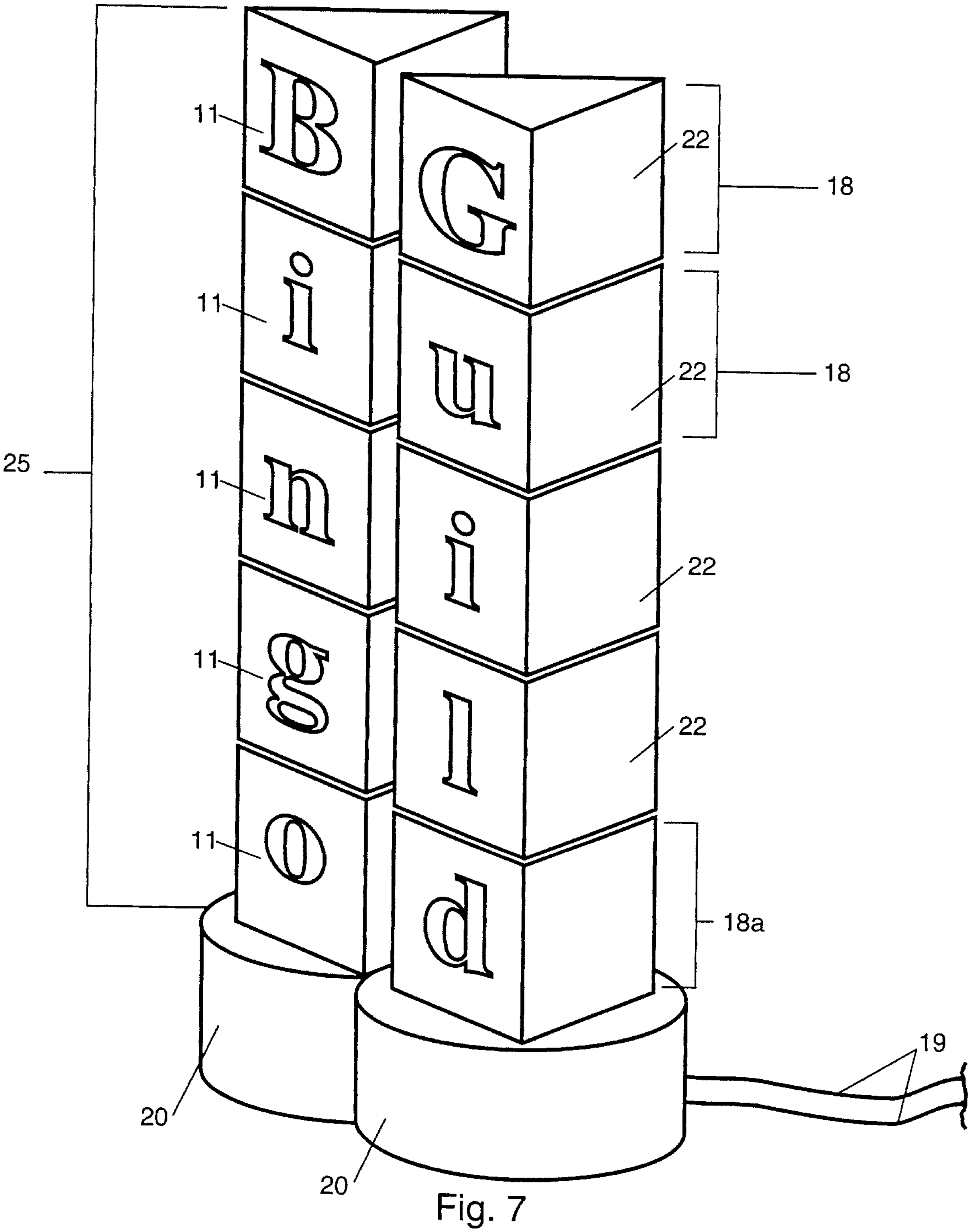
FIG. 7 is an isometric view of the second preferred embodiment, consisting of two columns with text.

A second preferred embodiment of the present invention is a dancing pair of columns as illustrated in FIG. 7. This embodiment provides a two column display device which has commercial applications as follows. A number of prism-shaped elements 18 are vertically stacked and loosely coupled together to form two columns 25 which behave as torsional wave media. The columns 25 can be of any height, for example, eight feet tall and one foot wide is a reasonable height. A round base 20 is adjacent to the bottommost prism-shaped elements 18*a* of each column 25. Each base 20 includes a motor 14, drive belt 16, gear 12, and computer motor interface 15. An electrical cable 19 connects the elements inside the round bases 20 to the computer 17. As in the other embodiments, the prism-shaped elements 18 have flat panel display areas 11. However, in this embodiment one or more flat panel display area(s) 11 are covered with text, logos, advertisements, or colored panels. The surfaces of the flat panel display areas 11 can be either permanently attached or easily altered by removal of the existing panel 11 and replacement with a different panel 11, as in FIG. 2, with the use of hook and loop type fasteners 55. Both columns 25 are choreographed by a single computer 17 such that their motions are synchronized together, and give the impression that the columns are "dancing" with each other, thereby creating an eye-catching commercial display.

Figure 8:
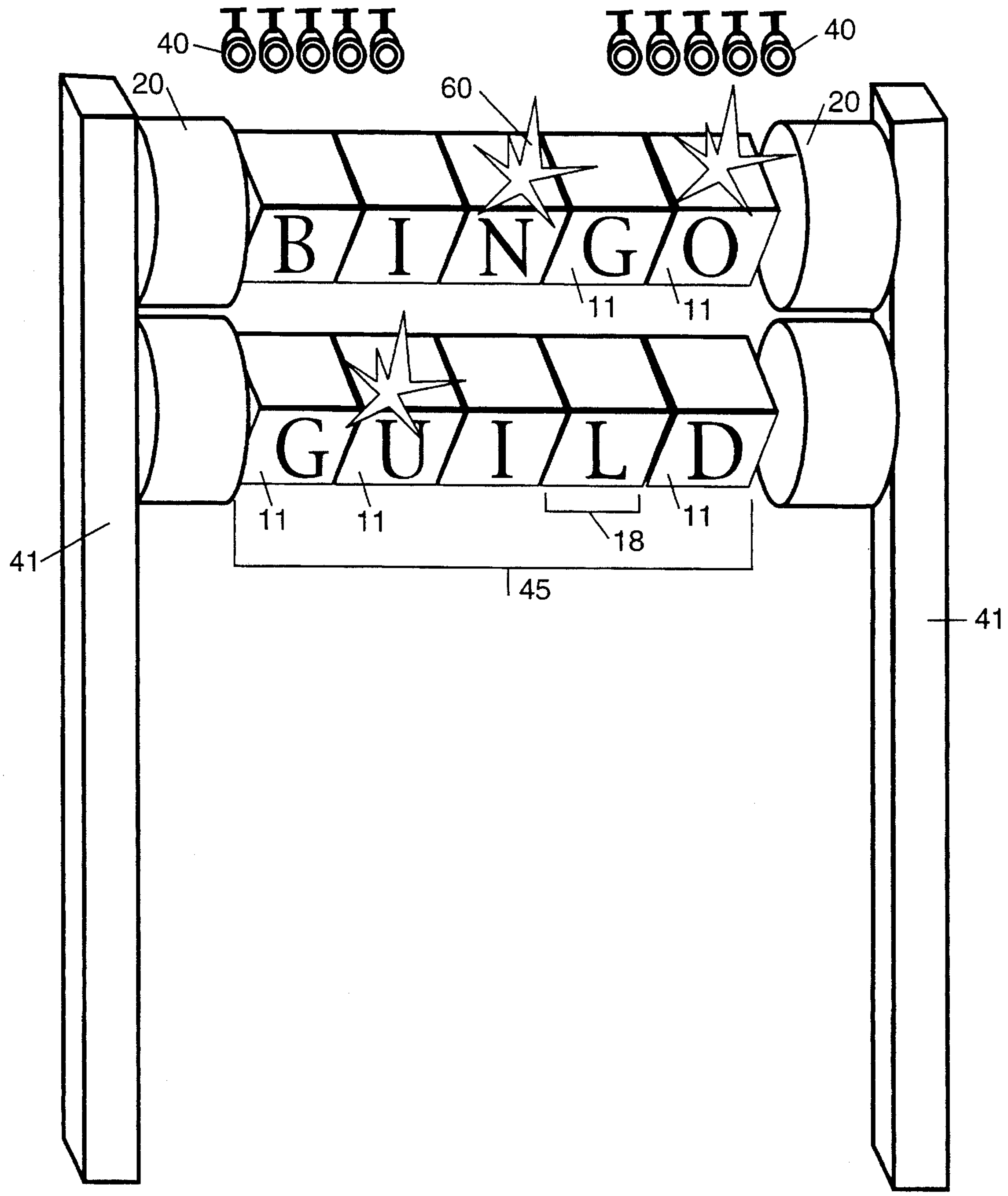
FIG. 8 is an isometric view of the third preferred embodiment with horizontal orientation.

A third preferred embodiment of the present invention is a horizontal pair of columns with imagery as illustrated in FIG. 8. This embodiment provides an amusement and display device which has commercial applications as follows. A number of prism-shaped elements 18 are linearly placed and coupled together in two or more horizontal rows 45, which function as torsional wave media. Two rows 45 are shown in this Figure, but any number can be used. The row 45 can be of any desired length. A round base 20 is adjacent to each of the endmost prism-shaped elements 18*a*, 18*b*. Each base consists of a motor 14, drive belt 16, gear 12, and computer motor interface 15. An electrical cable 19 connects the elements inside the round base 20 to the computer 17. The round bases 10 at the ends of each row 45 of prism-shaped elements 18 are connected to vertical structural beams 41 on either side. The two motors 14 allow for controlled rotation of the prism-shaped elements 18 around the stationary shaft In this embodiment one or more flat panel display area(s) 11 are covered with text, such as logos or advertisements, or colors. Other flat panel display area(s) 11 are covered with a reflective surface 11 such as mirrors which reflect light 42 from a light source 40. The surfaces of the flat panel display areas 11 can be either permanently attached or easily altered by removal of the existing panel 11 and replacement with a different panel 11, as in FIG. 2, with the use of hook and loop type fasteners 55.

Figure 9:
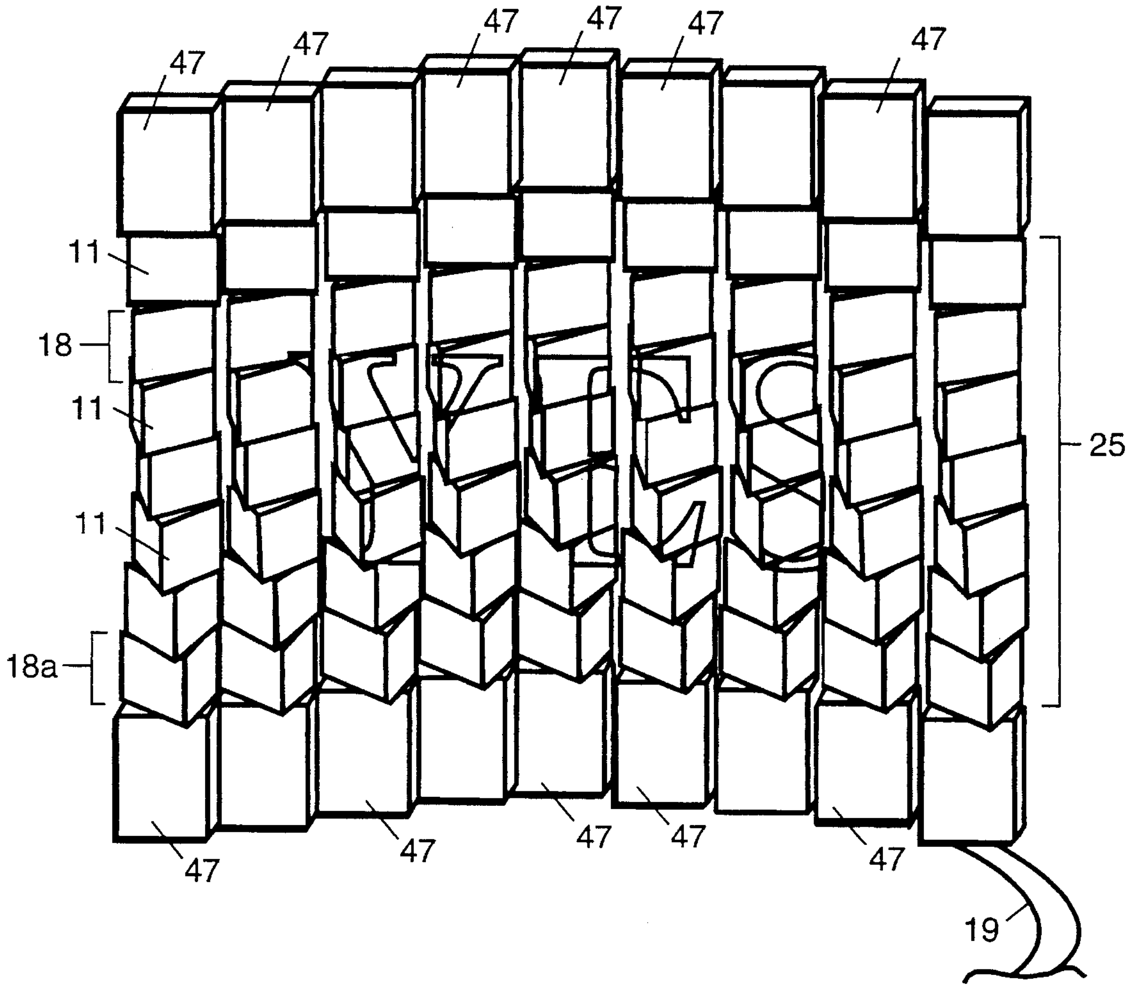
FIG. 9 is an isometric view of the fourth preferred embodiment, a wall of columns.

A fourth preferred embodiment of the present invention is a choreographable wall as illustrated in FIG. 9. This embodiment provides an amusement and display device which has commercial and educational applications as follows. A number of vertical columns 25 are placed side by side. The columns 25 can be of any desired height, although in this example the columns 25 are eight feet high. A base 47 is adjacent to each of the endmost prism-shaped elements 18*a*, 18*b*. Each base consists of a motor 14, drive belt 16, gear 12, and computer motor interface 15. An electrical cable 19 connects the elements inside the bases 47 to the computer 17. The computer 17 can access and alter individual column's motions, allowing controlled choreography of all of the columns 25.

In this embodiment, each flat panel display area 11 can be covered with a portion of a single image. When the prism-shaped elements 18 rotate in unison a new image can be displayed. The surfaces of the flat panel display areas 11 can be either permanently attached or easily altered by removal of the existing panel 11 and replacement with a different panel 11.

The present invention may be embodied in other specific forms without departing from the spirit or essential attributes thereof and accordingly, reference should be made to the appended claims, in addition to the foregoing specification, as indicating the scope of the invention.

I claim:

1. A three-dimensional amusement and display device comprising:

a plurality of three-dimensional rotatable elements, wherein said rotatable elements are linearly arranged along their axis of rotation;

means to produce rotation of said rotatable elements;

means to support said rotatable elements; and means of coupling said rotatable elements having a cam mounted on the bottom of one of said rotatable elements and a cam-following assembly mounted on the top of the adjacent rotatable element, such that each rotatable element is coupled to its adjacent neighbor, and such that the motion of the rotatable elements is governed by a force coupling function, thereby causing the rotatable elements to display the motions of a torsional wave medium and chaotic system.

2. A device as claimed in claim 1, wherein said support means comprises a shaft such that said rotatable elements are rotatable around said shaft.

3. A device as claimed in claim 1, wherein the surfaces of said rotatable elements comprises flat areas to which display panels are attached and easily altered by fastener means.

4. A device as claimed in claim 3, wherein the panels comprise a reflective material.

5. A device as claimed in claim 4, wherein a light source is externally mounted whereby said reflective panels reflect light from said light source.

6. A device as claimed in claim 1, wherein the surfaces of said rotatable elements comprises an area onto which for-sale products are mounted.

7. A device as claimed in claim 1, wherein said cam is of a shape such that the restoring torque on any rotatable element is linearly proportional to its twist angle with respect to its adjacent neighbor.

8. A device as claimed in claim 1, wherein said rotational means comprises electric servo motor means mechanically coupled to the two endmost rotatable elements.

9. A device as claimed in claim 8, wherein said electric servo motor means mechanically coupled to said two endmost rotatable elements utilizes said cam and said cam-following assembly.

10. A device as claimed in claim 8, wherein said electric servo motor means are controlled by a computerized closed-loop position feedback servo motor system.

11. A device as claimed in claim 10, wherein said electric servo motor means comprises two electric servo motors mechanically coupled to the two endmost rotatable elements.

12. A device as claimed in claim 10, wherein said computerized closed-loop position feedback servo motor system causes said electric servo motor means to respond to external events.

13. A device as claimed in claim 10, wherein said computerized closed-loop position feedback servo motor system permits synchronization between an audible output of an audio track and the motion of the rotatable elements.

14. A three-dimensional amusement and display device comprising:

a plurality of three-dimensional rotatable elements, wherein the surfaces of said rotatable elements comprises display panels and said rotatable elements are linearly arranged along their axis of rotation;

means to support said rotatable elements;

means to produce rotation of said rotatable elements; and means of coupling said rotatable elements having a cam mounted on the bottom of one of said rotatable elements and a cam-following assembly mounted on the top of the adjacent rotatable element, such that each rotatable element is coupled to its adjacent neighbor, and such that the motion of the rotatable elements is governed by a force coupling function, thereby causing the rotatable elements to display the motions of a torsional wave medium and chaotic system.

15. A device as claimed in claim 14, wherein said support means comprises a shaft such that said rotatable elements are rotatable around said shaft.

16. A device as claimed in claim 14, wherein the surfaces of said rotatable elements comprises flat areas to which display panels are attached and easily altered by fastener means.

17. A device as claimed in claim 16, wherein the panels comprise a reflective material.

18. A device as claimed in claim 17, wherein a light source is externally mounted whereby said reflective panels reflect light from said light source.

19. A device as claimed in claim 14, wherein the surfaces of said rotatable elements comprises an area onto which for-sale products are mounted.

20. A device as claimed in claim 14, wherein said cam is of a shape such that the restoring torque on any rotatable element is linearly proportional to its twist angle with respect to its adjacent neighbor.

21. A device as claimed in claim 14 wherein said rotational means comprises electric servo motor means mechanically coupled to the two endmost rotatable elements.

22. A device as claimed in claim 21, wherein said electric servo motor means mechanically coupled to said two endmost rotatable elements utilizes said cam and said cam-following assembly.

23. A device as claimed in claim 21, wherein said electric servo motor means are controlled by a computerized closed-loop position feedback servo motor system.

24. A device as claimed in claim 23, wherein said electric servo motor means comprises two electric servo motors mechanically coupled to the two endmost rotatable elements.

25. A device as claimed in claim 23, wherein said computerized closed-loop position feedback servo motor system causes said electric servo motor means to respond to external events.

26. A device as claimed in claim 23, wherein said computerized closed-loop position feedback servo motor system permits synchronization between an audible output of an audio track and the motion of the rotatable elements.

* * * * *